United States Patent
Patel et al.

(10) Patent No.: US 10,714,023 B2
(45) Date of Patent: Jul. 14, 2020

(54) DISPLAY INCLUDING LIQUID CRYSTAL LAYER WITH ORGANIC LIGHT EMITTING DIODE BACKLIGHT

(71) Applicant: Facebook Technologies, LLC, Menlo Park, CA (US)

(72) Inventors: Nirav Rajendra Patel, San Francisco, CA (US); Evan M. Richards, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 305 days.

(21) Appl. No.: 15/492,959

(22) Filed: Apr. 20, 2017

(65) Prior Publication Data

US 2017/0309233 A1 Oct. 26, 2017

Related U.S. Application Data

(60) Provisional application No. 62/325,864, filed on Apr. 21, 2016.

(51) Int. Cl.

| | | |
|---|---|---|
| *G09G 3/34* | (2006.01) | |
| *F21V 8/00* | (2006.01) | |
| *G06F 3/0346* | (2013.01) | |
| *G02F 1/13357* | (2006.01) | |
| *G09G 3/00* | (2006.01) | |

(52) U.S. Cl.
CPC ..... *G09G 3/3406* (2013.01); *G02F 1/133603* (2013.01); *G09G 3/003* (2013.01); *G02F 2001/133601* (2013.01); *G02F 2202/02* (2013.01); *G09G 2310/08* (2013.01); *G09G 2320/0233* (2013.01); *G09G 2320/0693* (2013.01)

(58) Field of Classification Search
CPC ............. G09G 3/3406; G09G 2310/08; G02B 6/0078; G02B 6/0068; G06F 3/0346
See application file for complete search history.

(56) References Cited

U.S. PATENT DOCUMENTS

| | | | |
|---|---|---|---|
| 2006/0268002 A1* | 11/2006 | Hewlett | G09G 3/3406 345/600 |
| 2013/0271506 A1* | 10/2013 | Lee | G09G 5/10 345/690 |
| 2014/0354709 A1* | 12/2014 | Mammen | G02F 1/133606 345/690 |
| 2015/0029236 A1* | 1/2015 | De Greef | H04N 13/341 345/690 |
| 2015/0371605 A1* | 12/2015 | Wu | G09G 5/02 345/604 |

(Continued)

*Primary Examiner* — Andrew Sasinowski
(74) *Attorney, Agent, or Firm* — Fenwick & West LLP

(57) ABSTRACT

Example embodiments of disclosed configurations include a display device with a liquid crystal layer and an organic light emitting diode backlight. In one or more embodiments, the liquid crystal display includes a liquid crystal layer including a plurality of liquid crystals grouped into a plurality of liquid crystal portions, and the organic light emitting diode backlight coupled to the liquid crystal layer. The organic light emitting diode backlight includes a plurality of OLED backlight portions, where each OLED backlight portion faces a corresponding liquid crystal portion and is configured to project light towards the corresponding liquid crystal portion.

20 Claims, 4 Drawing Sheets

(56) References Cited

U.S. PATENT DOCUMENTS

| | | | |
|---|---|---|---|
| 2016/0012641 A1* | 1/2016 | Kim | G06T 19/006 345/633 |
| 2016/0077344 A1* | 3/2016 | Burns | G02B 27/017 345/419 |
| 2017/0059151 A1* | 3/2017 | Black | F21V 33/0052 |

* cited by examiner

DISPLAY INCLUDING LIQUID CRYSTAL LAYER WITH ORGANIC LIGHT EMITTING DIODE BACKLIGHT

CROSS-REFERENCE TO RELATED APPLICATIONS

This application claims priority to and the benefit of U.S. Provisional Patent Application No. 62/325,864 filed on Apr. 21, 2016, which is incorporated herein by reference in its entirety.

FIELD

The present disclosure generally relates to a display device including a liquid crystal (LC) layer with an organic light emitting diode (OLED) display as a backlight.

BACKGROUND

Developments in a flat screen display technology have prompted proliferation of various electronic devices. Among various types of flat screen displays, an LCD is widely used in different electronic devices. An LCD includes a backlight and a liquid crystal (LC) layer disposed on the backlight. Typically, the backlight constantly projects light towards the LC layer, and the LC layer including a plurality of LCs controls an amount of the light passing through according to states of the plurality of LCs. A simple architecture of the LCD allows a flat screen to be implemented in low cost.

However, the LCD suffers from a few drawbacks. In one example, changing states of the LCs may take several milliseconds (ms), thereby limiting a response time of the LCD or preventing an increase in the frame rate (e.g., 90 Hz or higher). For virtual reality (VR) or augmented reality (AR) applications, images are generated according to a user's movement, and a slow response time may be noticed as latency or a lag. Moreover, continuously projected light from the backlight may cause a motion blur or image streaking, when images are displayed with a fast frame rate.

SUMMARY

Example embodiments of disclosed configurations include a display device with a liquid crystal layer and an OLED backlight. In one or more embodiments, the liquid crystal display includes a liquid crystal layer including a plurality of liquid crystals grouped into a plurality of liquid crystal portions, and the OLED backlight coupled to the liquid crystal layer. The OLED backlight includes a plurality of OLED backlight portions, where each OLED backlight portion faces a corresponding liquid crystal portion and is configured to project light towards the corresponding liquid crystal portion.

In one or more embodiments, the OLED backlight includes passive matrix OLEDs.

In one or more embodiments, the OLED backlight includes white color OLEDs.

In one or more embodiments, a resolution of the OLED is lower than a resolution of the liquid crystal layer.

In one or more embodiments, each OLED backlight portion projects the light towards the corresponding liquid crystal portion during a corresponding time period.

In one or more embodiments, the liquid crystal display device disclosed herein may be implemented in a head mounted display device. The head mounted display device includes a body, a position sensor and a liquid crystal display device. The position sensor is coupled to the body and detects an orientation of the head mounted display device. The liquid crystal display device is coupled to the body and displays an image according to the orientation of the head mounted display device. The head mounted display device may display an image of a virtual reality, an augmented reality, or both, according to the user's movement.

Figure 1:
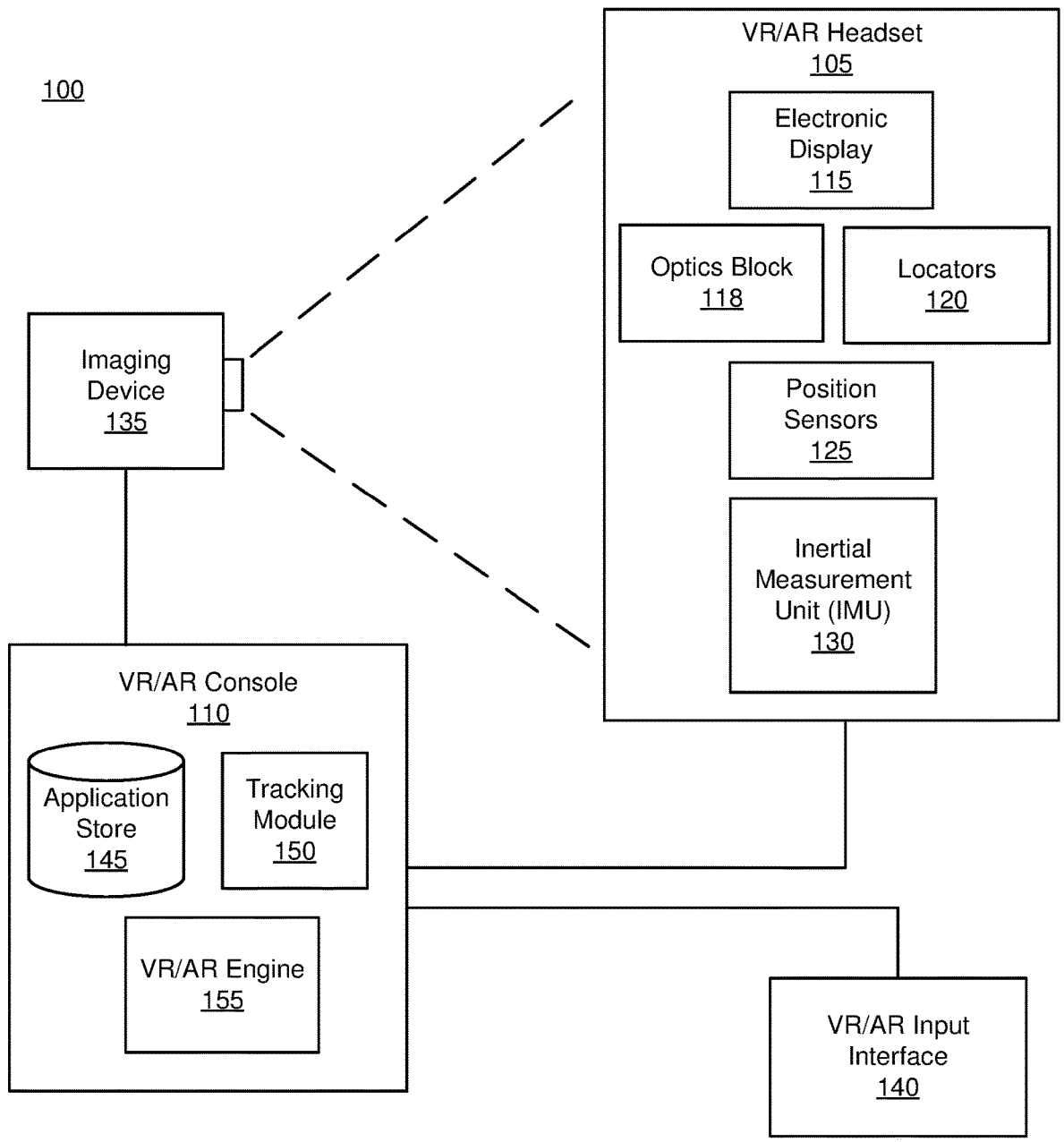
FIG. 1 is a block diagram of a system environment including a virtual reality (VR)/augmented reality (AR) system, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Example embodiments of disclosed configurations include a display device with a LC layer and an OLED backlight. The OLED backlight is an OLED display that can be controlled to selectively illuminate a portion of the OLED display. The LC layer is segmented into a plurality of liquid crystal portions, and a portion of the OLED backlight corresponding to a liquid crystal portion can be selectively controlled to illuminate light. While a portion of the OLED backlight is on, the remaining portion of the OLED backlight may be turned off.

In one or more embodiments, (i) programming and transitioning of a state of a liquid crystal in a liquid crystal portion and (ii) illuminating a portion of the OLED backlight corresponding to the liquid crystal portion can occur in an alternating sequence. Specifically, a first liquid crystal portion can be programmed and a state of a liquid crystal in the first liquid crystal portion can be transitioned according to the programming during a first time period. During a second time period after the first time period, a first portion of the OLED backlight corresponding to the first liquid crystal portion can be illuminated, while a second liquid crystal portion can be programmed and a state of a liquid crystal in the second liquid crystal portion can be transitioned according to the programming. As a result, latency involved for programming a portion of the liquid crystal layer, and illuminating light can be reduced.

Programming a liquid crystal herein refers to applying electric signals (e.g., voltage or current) to cause the liquid crystal to be placed in a desired state.

In one application, a display including a LC layer and an OLED backlight disclosed herein can be implemented in a VR/AR system. In a VR/AR system, a user wears a head mounted display that presents an image of a VR/AR to the user, according to a physical movement of the user. For example, if a user turns his/her head to the left, a corresponding image of the virtual image is presented to the user, according to the user motion. However, generating the image according to the user movement involves a complex processing that accompanies with a delay between the user movement and the image presented. In case the user moves faster than the delay associated with presenting the image according to the user movement, the user may perceive a feeling of "lag" or a noticeable delay between the user movement and the image presented. By implementing the disclosed display with a liquid crystal layer and the OLED backlight, high quality images (e.g., 1080 by 720 pixels or higher) of the VR/AR can be presented to the user without a noticeable lag.

System Overview

FIG. 1 is a block diagram of a VR/AR system 100 in which a VR/AR console 110 operates. The system 100 shown by FIG. 1 comprises a VR/AR headset 105, an imaging device 135, and a VR/AR input interface 140 that are each coupled to the VR/AR console 110. While FIG. 1 shows an example system 100 including one VR/AR headset 105, one imaging device 135, and one VR/AR input interface 140, in other embodiments any number of these components may be included in the system 100. For example, there may be multiple VR/AR headsets 105 each having an associated VR/AR input interface 140 and being monitored by one or more imaging devices 135, with each VR/AR headset 105, VR/AR input interface 140, and imaging devices 135 communicating with the VR/AR console 110. In alternative configurations, different and/or additional components may be included in the system 100.

The VR/AR headset 105 is a head-mounted display that presents media to a user. Examples of media presented by the VR/AR head set include one or more images, video, audio, or some combination thereof. In some embodiments, audio is presented via an external device (e.g., speakers and/or headphones) that receives audio information from the VR/AR headset 105, the VR/AR console 110, or both, and presents audio data based on the audio information. An embodiment of the VR/AR headset 105 is further described below in conjunction with FIGS. 2A and 2B. The VR/AR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR/AR headset 105 includes an electronic display 115, an optics block 118, one or more locators 120, one or more position sensors 125, and an inertial measurement unit (IMU) 130. The electronic display 115 displays images to the user in accordance with data received from the VR/AR console 110. In various embodiments, the electronic display 115 may comprise a single electronic display or multiple electronic displays (e.g., an electronic display for each eye of a user). The electronic display 115 may be a combination of a liquid crystal display (LCD), and an organic light emitting diode (OLED) display as described in detail with respect to FIG. 3 below.

The optics block 118 magnifies received light from the electronic display 115, corrects optical errors associated with the image light, and the corrected image light is presented to a user of the VR/AR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR/AR headset 105 relative to one another and relative to a specific reference point on the VR/AR headset 105. A locator 120 may be a light emitting diode (LED), a corner cube reflector, a reflective marker, a type of light source that contrasts with an environment in which the VR/AR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR/AR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR/AR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR/AR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR/AR headset 105 relative to an initial position of the VR/AR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR/AR headset 105 from the sampled data. For example, the IMU 130 integrates the measurement signals received from the accelerometers over time to estimate a velocity vector and integrates the velocity vector over time to determine an estimated position of a reference point on the VR/AR headset 105. Alternatively, the IMU 130 provides the sampled measurement signals to the VR/AR console 110, which determines the fast calibration data. The reference point is a point that may be used to describe the position of the VR/AR headset 105. While the reference point may generally be defined as a point in space; however, in practice the reference point is defined as a point within the VR/AR headset 105 (e.g., a center of the IMU 130).

The IMU 130 receives one or more calibration parameters from the VR/AR console 110. As further discussed below, the one or more calibration parameters are used to maintain tracking of the VR/AR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR/AR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR/AR console 110, and the imaging device 135 receives one or more calibration parameters from the VR/AR console 110 to adjust one or more imaging parameters (e.g., focal length, focus, frame rate, ISO, sensor temperature, shutter speed, aperture, etc.).

The VR/AR input interface 140 is a device that allows a user to send action requests to the VR/AR console 110. An action request is a request to perform a particular action. For example, an action request may be to start or end an application or to perform a particular action within the application. The VR/AR input interface 140 may include one or more input devices. Example input devices include: a keyboard, a mouse, a game controller, or any other suitable device for receiving action requests and communicating the received action requests to the VR/AR console 110. An action request received by the VR/AR input interface 140 is communicated to the VR/AR console 110, which performs an action corresponding to the action request. In some embodiments, the VR/AR input interface 140 may provide haptic feedback to the user in accordance with instructions received from the VR/AR console 110. For example, haptic feedback is provided when an action request is received, or the VR/AR console 110 communicates instructions to the VR/AR input interface 140 causing the VR/AR input interface 140 to generate haptic feedback when the VR/AR console 110 performs an action.

The VR/AR console 110 provides media to the VR/AR headset 105 for presentation to the user in accordance with information received from one or more of: the imaging device 135, the VR/AR headset 105, and the VR/AR input interface 140. In the example shown in FIG. 1, the VR/AR console 110 includes an application store 145, a tracking module 150, and a VR/AR engine 155. Some embodiments of the VR/AR console 110 have different modules than those described in conjunction with FIG. 1. Similarly, the functions further described below may be distributed among components of the VR/AR console 110 in a different manner than is described here.

The application store 145 stores one or more applications for execution by the VR/AR console 110. An application is a group of instructions, that when executed by a processor, generates content for presentation to the user. Content generated by an application may be in response to inputs received from the user via movement of the VR/AR headset 105 or the VR/AR input interface 140. Examples of applications include: gaming applications, conferencing applications, video playback application, or other suitable applications.

The tracking module 150 calibrates the VR/AR system 100 using one or more calibration parameters and may adjust one or more calibration parameters to reduce error in determination of the position of the VR/AR headset 105. For example, the tracking module 150 adjusts the focus of the imaging device 135 to obtain a more accurate position for observed locators on the VR/AR headset 105. Moreover, calibration performed by the tracking module 150 also accounts for information received from the IMU 130. Additionally, if tracking of the VR/AR headset 105 is lost (e.g., the imaging device 135 loses line of sight of at least a threshold number of the locators 120), the tracking module 150 re-calibrates some or all of the system 100.

The tracking module 150 tracks movements of the VR/AR headset 105 using slow calibration information from the imaging device 135. The tracking module 150 determines positions of a reference point of the VR/AR headset 105 using observed locators from the slow calibration information and a model of the VR/AR headset 105. The tracking module 150 also determines positions of a reference point of the VR/AR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR/AR headset 105 to the VR/AR engine 155.

The VR/AR engine 155 executes applications within the system 100 and receives position information, acceleration information, velocity information, predicted future positions, or some combination thereof of the VR/AR headset 105 from the tracking module 150. Based on the received information, the VR/AR engine 155 determines content to provide to the VR/AR headset 105 for presentation to the user. For example, if the received information indicates that the user has looked to the left, the VR/AR engine 155 generates content for the VR/AR headset 105 that mirrors the user's movement in a virtual environment. Additionally, the VR/AR engine 155 performs an action within an application executing on the VR/AR console 110 in response to an action request received from the VR/AR input interface 140 and provides feedback to the user that the action was performed. The provided feedback may be visual or audible feedback via the VR/AR headset 105 or haptic feedback via the VR/AR input interface 140.

Figure 2A:
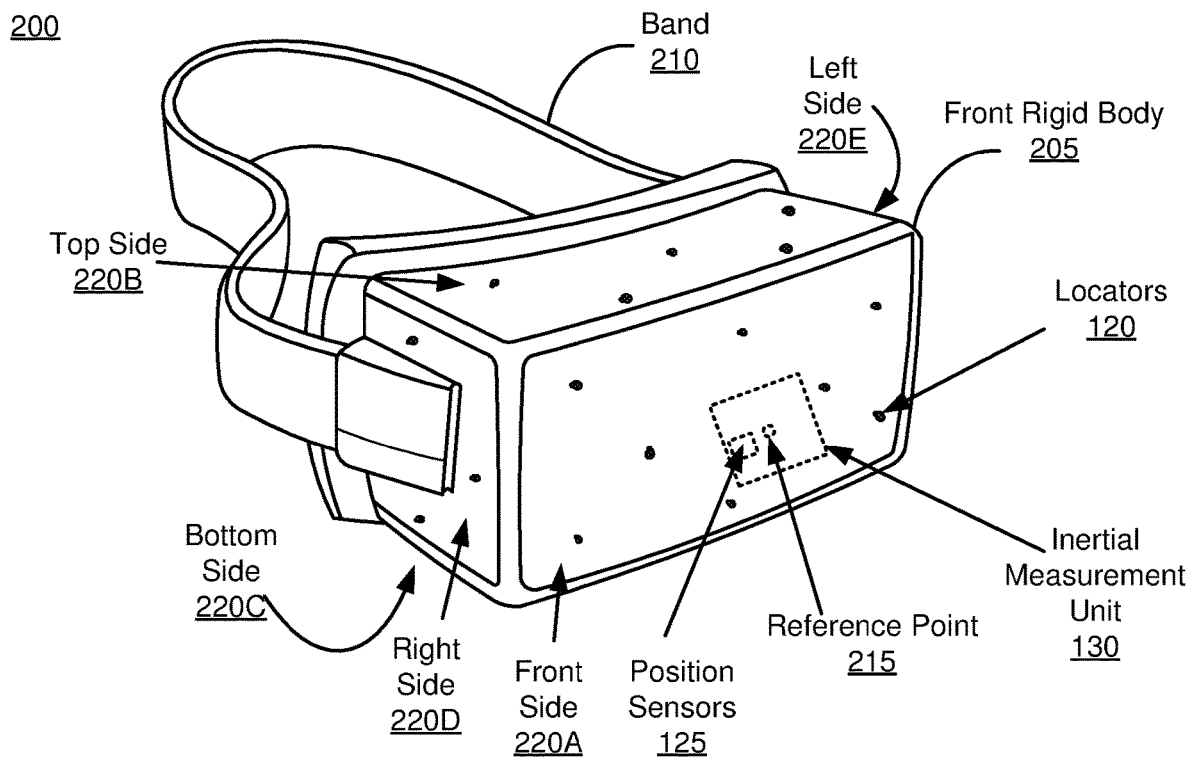
FIG. 2A is a diagram of a VR/AR headset, in accordance with an embodiment.

FIG. 2A is a diagram of a VR/AR headset, in accordance with an embodiment. The VR/AR headset 200 is an embodiment of the VR/AR headset 105, and includes a front rigid body 205 and a band 210. The front rigid body 205 includes an electronic display 115, the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
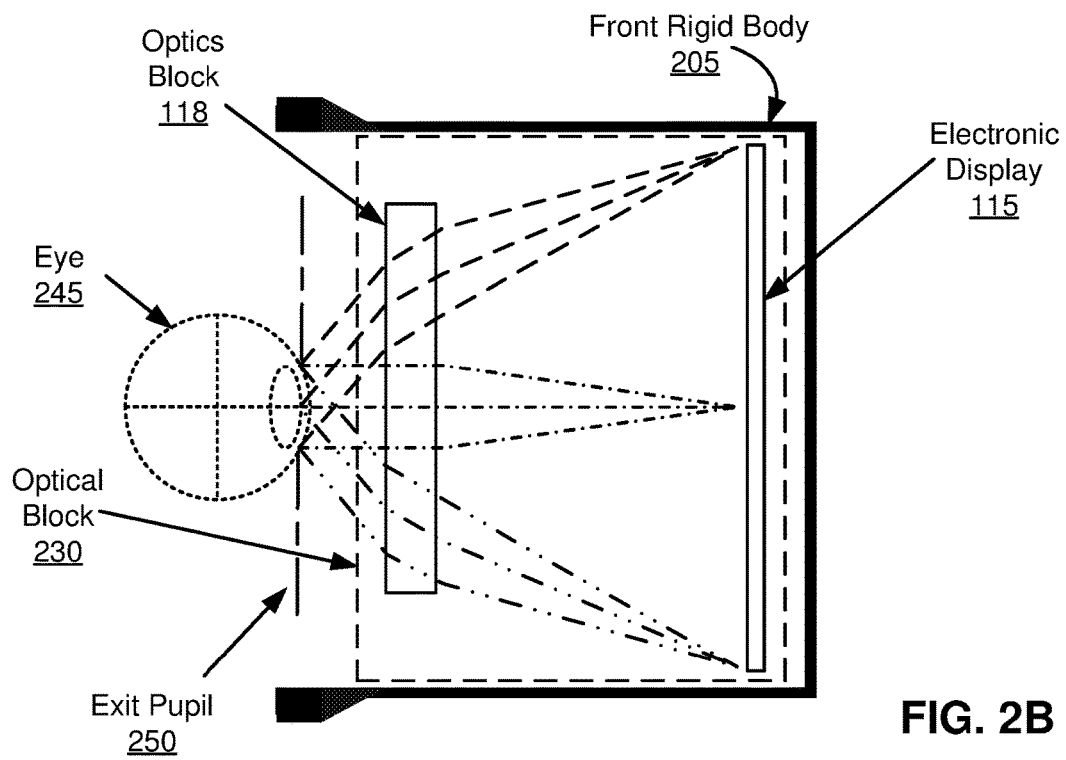
FIG. 2B is a cross section of a front rigid body of the VR/AR headset in FIG. 2A, in accordance with an embodiment.

FIG. 2B is a cross section 225 of the front rigid body 205 of the embodiment of a VR/AR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display 115, and the optics block 118. The electronic display 115 emits image light toward the optics block 118. The optics block 118 magnifies the image light, and in some embodiments, also corrects for one or more additional optical errors (e.g., distortion, astigmatism, etc.). The optics block 118 directs the image light to the exit pupil 250 for presentation to the user.

Figure 3:
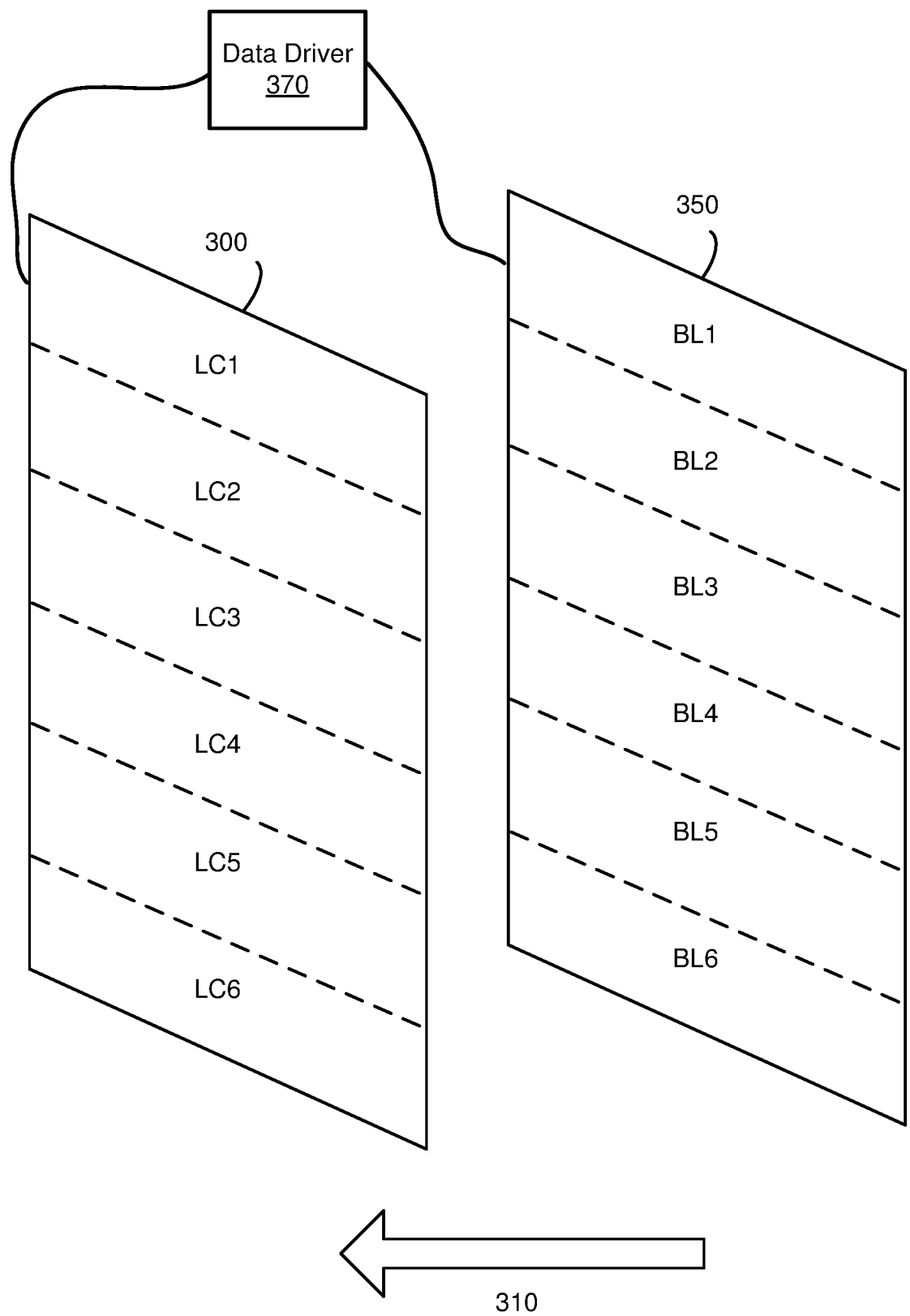
FIG. 3 is an exploded view of an example electronic display including a LC layer with an OLED backlight, in accordance with an embodiment.

FIG. 3 is an exploded view of an example electronic display 115 including a LC layer 300, an OLED backlight 350, and a data driver 370, in accordance with an embodiment. The data driver 370 generates a backlight control signal and a liquid crystal control signal for displaying an image. The OLED backlight 350 illuminates light towards the liquid crystal layer 300 according to the backlight control signal, and the liquid crystal layer 300 controls an amount and location of light passing through the liquid crystal layer 300 towards the exit pupil 250 in a direction 310 according to the liquid crystal control signal. A boundary of the liquid crystal layer 300 and a boundary of the OLED backlight 350 may be mechanically coupled to each other through a spacer (not shown). A space between the liquid crystal layer 300 and the OLED backlight 350 may be vacuum or filled with transparent material. In other embodiments, the electronic display 115 includes different, more or fewer components than shown in FIG. 3.

The OLED backlight 350 is an OLED display that is programmable to emit light in a selected portion of the OLED display. In one embodiment, the OLED backlight 350 is controlled in a binary manner to emit or not emit light in a selected portion. Hence, the OLED backlight 350 can be implemented as a passive matrix OLED (PMOLED) display having a simple control scheme without storage capacitors for a low cost implementation. Alternatively, the OLED backlight 350 can be implemented as an active matrix OLED (AMOLED) display, or other types of light emitting components, in which a selected portion can be controlled for emitting or not emitting light.

In the example shown in FIG. 3, the OLED backlight 350 is segmented into backlight portions BL1, BL2 . . . BL6. In this example, the OLED backlight portions BL1, BL2 . . . BL6 are arranged in a row direction in a manner that a bottom side of an OLED backlight portion BL is coupled to a top side of its adjacent backlight portion BL (e.g., a bottom side of the OLED backlight portion BL1 is coupled to a top side of the OLED backlight portion BL2). Although the OLED backlight 350 in FIG. 3 is segmented into six backlight portions, in other examples, the OLED backlight 350 can include a different number of segmented backlight portions or segmented into different spatial portions than shown in FIG. 3. In some embodiments, each backlight portion of the OLED backlight 350 may not have a rectangular bar shape that stretches along a width of the display. Instead, each backlight portion may have one or more rectangular shapes or other shapes smaller than the width of the display that form a regular or irregular tiled pattern behind the LC layer 300. This enables local dimming (improved LCD contrast) in addition to the fast, flexible addressing in a thin package compared to conventional LED backlights. According to the backlight control signal, a selected backlight portion illuminates light toward the liquid crystal layer 300 in the direction 310, while remaining portions do not.

Generally, brightness of an OLED is much lower than a traditional backlight of a LC display (e.g., a light guide with LED light source). To improve brightness of the OLED backlight 350, pixel size of the OLED backlight 350 can be larger than pixels of the LC layer 300 (i.e., a resolution of the OLED backlight 350 is lower than a resolution of the LC layer 300), where light from a single pixel of the OLED backlight 350 may be projected to two or more pixels of the LC layer 300. By implementing the OLED backlight 350 with larger size pixels, brightness of the OLED backlight 350 can be improved. Additionally, a brightness enhanced film (BEF) may be disposed on the OLED backlight 350 or on the LC layer 300 to further improve brightness.

Implementing the OLED backlight 350 with larger pixel sizes than the pixel sizes of the LC layer 300 is also beneficial in terms of implementation costs, because a high resolution LC layer is inexpensive than a comparable resolution OLED display. To further reduce the implementation costs, the OLED backlight 350 may include only white OLEDs, with a color filter on the LC layer 300. Alternatively, RGB OLEDs can be implemented in the OLED backlight 350 without the color filter to improve color gamut or spatially homogenize colors.

The liquid crystal layer 300 receives a liquid crystal control signal from the data driver 370, and passes light from the OLED backlight 350 towards the exit pupil in the direction 310, according to the liquid crystal control signal. The liquid crystal control signal is a signal indicative of an amount of light passing through the liquid crystal layer 300 for different pixels of the liquid crystal layer 300. The liquid crystal layer 300 includes a plurality of liquid crystals corresponding to a plurality of pixels, and configurations of the liquid crystals can be changed according to the liquid crystal control signal applied across electrodes of the liquid crystal layer 300. In the example shown in FIG. 3, the liquid crystal layer 300 is programmed in units of a plurality of segmented liquid crystal portions LC1, LC2 . . . LC6. In this example, each of the liquid crystal portions LC1, LC2 . . . LC6 corresponds to a respective one of the OLED backlight portions BL1, BL2 . . . BL6, and faces a corresponding OLED backlight portion. Each liquid crystal portion may encompass multiple rows of pixels. Although the liquid crystal layer 300 in FIG. 3 is segmented into six liquid crystal portions, in other examples, the liquid crystal layer 300 can include a different number of segmented liquid crystal portions. In other examples, two or more of the liquid crystal portions may correspond to and overlap with a single OLED backlight portion.

The data driver 370 is a circuit component that receives an input image data, and generates control signals for driving the liquid crystal layer 300 and the OLED backlight 350. The input image data may correspond to an image or a frame of a video in a virtual reality and/or augmented reality application transmitted from the VR/AR console 110. The data driver 370 generates the backlight control signal for controlling intensity of light output by the OLED backlight 350, according to the input image data. In addition, the data driver 370 generates the liquid crystal control signal for controlling an amount of light from the OLED backlight 350 traveling towards the exit pupil 250 through the liquid crystal layer 300. The data driver 370 provides the backlight control signal to the OLED backlight 350, and the liquid crystal control signal to the liquid crystal layer 300 at a proper timing to display a single image.

Rather than displaying an image only through an OLED display without the LC layer 300, the OLED backlight 350 operates as a programmable backlight of a conventional LC display device. By employing the OLED display (e.g., PMOLED or AMOLED display) as the OLED backlight 350, a selected portion of the OLED backlight 350 can be controlled to emit light in a flexible sequence (e.g., from top to bottom or from center to edges).

Figure 4:
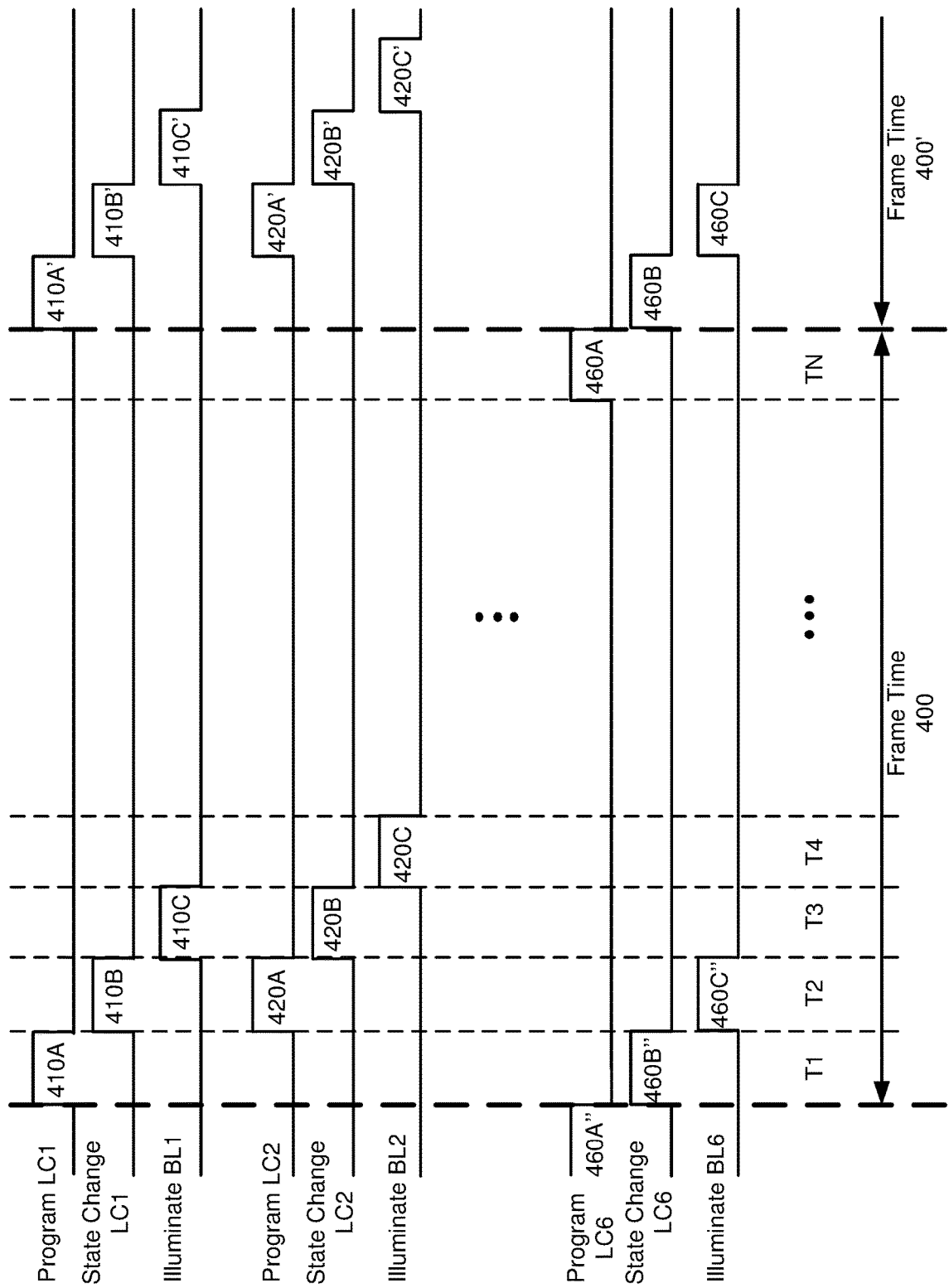
FIG. 4 is a timing diagram of operation of the example electronic display of FIG. 3, in accordance with an embodiment.

FIG. 4 is a timing diagram of operation of the example electronic display of FIG. 3, in accordance with an embodiment. The data driver 370 applies a liquid crystal control signal to cause programming of liquid crystals during programming time periods 410A, 420A . . . 460A, and liquid crystal state transitioning during liquid crystal transition time periods 410B, 420B . . . 460B. In addition, the data driver 370 applies a backlight control signal to the OLED backlight 350 to illuminate light during backlight illumination time periods 410C, 420C . . . 426C for displaying an image for a frame time 400 (e.g., 11 ms).

In one embodiment, (i) programming and transitioning of states of liquid crystals in a liquid crystal portion LC and (ii) illuminating a corresponding backlight portion BL can occur in an alternating sequence. Specifically, the liquid crystal portion LC1 is programmed during a programming time period 410A at T1. After the liquid crystal portion LC1 is programmed, states of liquid crystals in the liquid crystal portion LC1 are transitioned during a liquid crystal transition time period 410B at T2. After transitioning states of the liquid crystals in the liquid crystal portion LC1, the backlight portion BL1 illuminates light during a backlight illumination time period 410C at T3.

While the states of the liquid crystals in the liquid crystal portion LC1 are in transition, the liquid crystal portion LC2 is programmed during a programming time period 420A at T2. In addition, states of liquid crystals in the liquid crystal portion LC2 are transitioned during the liquid crystal transition time period 420B at T3, while the backlight portion BL1 illuminates light. After the states of the liquid crystals in the liquid crystal portion LC2 are transitioned, the backlight portion BL2 illuminates light during a backlight illumination time period 420C at T4.

For a last liquid crystal portion and a backlight portion (e.g., LC6 and BL6), the last liquid crystal portion (e.g., LC6) is programmed during a programming time period 460A at TN of the frame time 400. A frame time 400 herein refers to time duration between starting times of two image frames (i.e., starting times of programming LC1 of two image frames). States of liquid crystals in the last liquid crystal portion LC6 are transitioned during a liquid crystal transition time period 460B, while the liquid crystal portion LC1 is programmed during the programming time period 410A' at T1 of the next frame time 400'. In addition, the last backlight portion (e.g., BL6) illuminates light during a backlight illumination time period 460C, while states of liquid crystals in the liquid crystal portion LC1 are in transition during the liquid crystal transition time period 410B' at T2 of the next frame time 400'. Accordingly, a portion of an image corresponding to the last liquid crystal portion and the last backlight portion (e.g., LC6 and BL6) is displayed, while states of liquid crystals in the first liquid crystal portion LC1 are in transition for displaying a subsequent image.

In another embodiment, state transitions occur automatically after programming, thus time periods 410B, 420B . . . 460B for transitioning states of liquid crystals may be omitted. In this embodiment, time periods for programming liquid crystals and transitioning states of the liquid crystals can be combined into a single time period.

Advantageously, by segmenting the liquid crystal layer 300 and selectively illuminating a portion of the OLED backlight 350 as shown in FIG. 3, and displaying an image as shown in FIG. 4, latency involved for programming a portion of the liquid crystal layer and illuminating light can be reduced. In particular, compared to a conventional display panel in which the backlight portion illuminates light after completing programming and transitioning states of all liquid crystals, additional time can be allocated for programming and transitioning states of liquid crystals for a given frame time by segmenting the liquid crystal layer, and sequentially programming and illuminating light according to one or more embodiments disclosed herein. Accordingly, additional time for programming and transitioning states of liquid crystals allows high quality images (e.g., 1080 by 720 pixels or higher) to be presented to the user in response to the user motion without a noticeable lag to provide a seamless VR/AR experience to the user. In one aspect, a portion (e.g., last crystal portion) of a display projects a portion of an image frame, while another portion of the display is being programmed or is being configured for displaying another portion of a subsequent image frame, causing a delay of the portion of the image frame displayed. However, a user experiencing a virtual reality or an augmented reality is less likely to focus on the last crystal portion, and such delay of the portion of the image frame displayed may be unnoticeable.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A liquid crystal display device comprising:
   a liquid crystal layer including a plurality of liquid crystals grouped into a plurality of liquid crystal portions; and
   an organic light emitting diode (OLED) backlight coupled to the liquid crystal layer, the OLED backlight including a plurality of OLED backlight portions, each OLED backlight portion facing a corresponding liquid crystal portion and configured to project light towards the corresponding liquid crystal portion, wherein a last OLED backlight portion of the plurality of OLED backlight portions is configured to project light to a corresponding last liquid crystal portion of the plurality of liquid crystal portions over a time period at least partially overlapping with a frame time of a subsequent frame.

2. The liquid crystal display device of claim 1, wherein the OLED backlight includes passive matrix OLEDs.

3. The liquid crystal display device of claim 1, wherein the OLED backlight includes white color OLEDs.

4. The liquid crystal display device of claim 1, wherein a resolution of the OLED backlight is lower than a resolution of the liquid crystal layer.

5. The liquid crystal display device of claim 1, wherein each OLED backlight portion projects the light towards the corresponding liquid crystal portion during a corresponding time period.

6. The liquid crystal display device of claim 1, wherein an OLED backlight portion of the plurality of OLED backlight portions projects the light to a liquid crystal portion of the plurality of liquid crystal portions, while states of liquid crystals of an adjacent liquid crystal portion are in transition, the adjacent liquid crystal portion adjacent to the liquid crystal portion.

7. The liquid crystal display device of claim 1, wherein the plurality of OLED backlight portions include a first OLED backlight portion and a second OLED backlight portion, and wherein the plurality of liquid crystal portions include a first liquid crystal portion and a second liquid crystal portion facing the first OLED backlight portion and the second OLED backlight portion respectively.

8. The liquid crystal display device of claim 7, wherein the first OLED backlight portion projects the light to the first liquid crystal portion during a first illumination time period, and the second OLED backlight portion projects the light to the second liquid crystal portion during a second illumination time period after the first illumination time period.

9. The liquid crystal display device of claim 8, wherein the second OLED backlight portion is turned off during the first illumination time period, and wherein the first OLED backlight portion is turned off during the second illumination time period.

10. The liquid crystal display device of claim 8, wherein the first liquid crystal portion is programmed during a first programming time period of a frame time, and wherein the second liquid crystal portion is programmed during a second programming time period of the frame time.

11. The liquid crystal display device of claim 10, wherein the first programming time period of the frame time is before the first illumination time period of the frame time, and wherein the second programming time period of the frame time is after the first programming time period of the frame time and before the second illumination time period of the frame time.

12. The liquid crystal display device of claim 8, wherein the plurality of OLED backlight portions further include a third OLED backlight portion, and wherein the plurality of liquid crystal portions further include a third liquid crystal portion facing the third OLED backlight portion, the second OLED backlight portion disposed between the first OLED backlight portion and the third OLED backlight portion, the second liquid crystal portion disposed between the first liquid crystal portion and the third liquid crystal portion.

13. The liquid crystal display device of claim 12, wherein the third liquid crystal portion is programmed during a third programming time period of a frame time and the third OLED backlight portion projects the light to the third liquid crystal portion during a third illumination time period of a subsequent time frame.

14. The liquid crystal display device of claim 1, wherein each liquid crystal portion encompasses corresponding rows of pixels.

15. A head mounted display device comprising:
   a body;
   a position sensor coupled to the body, the position sensor to detect an orientation of the head mounted display device; and
   a liquid crystal display device coupled to the body, the liquid crystal display device to display an image according to the orientation of the head mounted display device, the liquid crystal display device including:
      a liquid crystal layer including a plurality of liquid crystals grouped into a plurality of liquid crystal portions, and
      an organic light emitting diode (OLED) backlight coupled to the liquid crystal layer, the OLED backlight including a plurality of OLED backlight portions, each OLED backlight portion facing a corresponding liquid crystal portion and configured to project light towards the corresponding liquid crystal portion, wherein a last OLED backlight portion of the plurality of OLED backlight portions is configured to project light to a corresponding last liquid crystal portion of the plurality of liquid crystal portions over a time period at least partially overlapping with a frame time of a subsequent frame.

16. The head mounted display device of claim 15, wherein the OLED backlight includes passive matrix OLEDs.

17. The head mounted display device of claim 15, wherein the OLED backlight includes white color OLEDs.

18. The head mounted display device of claim 15, wherein a resolution of the OLED backlight is lower than a resolution of the liquid crystal layer.

19. The head mounted display device of claim 15, wherein each OLED backlight portion projects the light towards the corresponding liquid crystal portion during a corresponding time period.

20. The head mounted display device of claim 15, wherein an OLED backlight portion of the plurality of OLED backlight portions projects the light to a liquid crystal portion of the plurality of liquid crystal portions, while states of liquid crystals of an adjacent liquid crystal portion are in transition, the adjacent liquid crystal portion adjacent to the liquid crystal portion.

* * * * *